United States Patent [19]

Vannetti

[11] Patent Number: 5,159,179
[45] Date of Patent: Oct. 27, 1992

[54] HEATING DEVICE FOR ACCELERATING THE ACTION OF EXPANSIVE MORTARS

[75] Inventor: Rossano Vannetti, Grosseto, Italy

[73] Assignee: Chimica Edile Artigiani di Ghini & Pasquini S.n.c., Grosseto, Italy

[21] Appl. No.: 491,340

[22] Filed: Mar. 9, 1990

[30] Foreign Application Priority Data

Mar. 15, 1989 [IT] Italy ................. 9365 A/89

[51] Int. Cl.$^5$ ............................. B02C 19/12
[52] U.S. Cl. ..................... 219/523; 219/534; 299/95; 241/23
[58] Field of Search .......... 219/523, 544, 534, 539; 338/217, 218, 239, 243; 241/1, 23, 30, 65, 301; 165/142; 225/1; 166/308; 252/157; 299/11, 16, 95

[56] References Cited

U.S. PATENT DOCUMENTS

| 2,499,961 | 3/1950 | Lennox | 219/523 |
| 3,678,249 | 7/1972 | Lennox | 219/544 |
| 3,911,251 | 10/1975 | Day | 219/523 |
| 3,927,301 | 12/1975 | Hevel et al. | 219/523 |
| 3,970,822 | 7/1976 | Wrob | 219/541 |
| 4,574,875 | 3/1986 | Rawlings et al. | 165/45 |
| 4,630,779 | 12/1986 | Suuchi et al. | 241/1 |
| 4,651,817 | 3/1987 | Dugger et al. | 165/86 |
| 4,671,351 | 6/1987 | Rappe | 165/133 |
| 4,700,053 | 10/1987 | Driggers et al. | 219/523 |
| 4,965,436 | 10/1990 | Churchill | 219/544 |

FOREIGN PATENT DOCUMENTS

| 0043574 | 3/1985 | Japan | 241/23 |
| 0161751 | 8/1985 | Japan | 241/1 |

Primary Examiner—Bruce A. Reynolds
Assistant Examiner—Michael D. Switzer
Attorney, Agent, or Firm—McGlew & Tuttle

[57] ABSTRACT

A device for accelerating the action of common expansive mortars (M) (used as a replacement for explosive products for demolition and cutting operations on blocks of rock or concrete) comprises at least one heating element (1), which is introduced into the hole (3) within the action of the mortar (M) is to be exerted, in order, to heat the mass of said mortar (M) sufficiently to accelerate the chemical reactions which determine the expansion thereof.

2 Claims, 1 Drawing Sheet

HEATING DEVICE FOR ACCELERATING THE ACTION OF EXPANSIVE MORTARS

FIELD OF THE INVENTION

The invention relates to a device for accelerating the action of common expansive mortars (used as a replacement for explosive products for demolition and cutting operations on blocks of rock or concrete); in practice these mortars, while possessing indisputable advantages as compared with mining explosives—specifically, as a result of not requiring precautions either in respect of their use or in respect of their storage possess the serious disadvantage of being very slow to act, this slowness increasing with decreasing ambient temperature.

SUMMARY AND OBJECTS OF THE INVENTION

According to the invention, a device for accelerating the action of expansive mortars comprises at least one heating element, which is introduced into the hole within which the action of the mortar is to be exerted, in order to heat the mass of said mortar sufficiently to accelerate the chemical reactions which determine the expansion thereof. This arrangement allows a faster reaction of the expansive mortar to be achieved, so that the demolition or cutting operations can be completed in a shorter time. Thermal power can be supplied to the expansive mortar by means of any heating element, e.g. a heating exchanger in which a thermal carrier fluid such as steam, hot water or hot oil is made to circulate. But in a preferred embodiment, the heating element is an electrical resistor having transverse dimensions which are very small in comparison to the diameter of the hole.

It is further envisaged that, in order to accelerate the action of the mortar in holes of substantial length, the device can comprise a plurality of sectional resistors which can be fitted together one as an extension of the other, and connected in series or in parallel to a single electrical power supply.

For reasons of safety, it is also envisaged that the resistor or the assembly of sectional resistors are connected to low voltage, in most cases to a voltage below 50 V.

In a particularly advantageous embodiment of the invention, it is provided that the heating element is suitable for generating a thermal flux which varies along the axis of the hole in which the heating element is inserted. More particularly, it was found that optimum results can be achieved when the section of the heating element placed near the bottom of the hole is the one which generates the highest thermal flux, that is to say the highest thermal power per unit length of the hole, while the smallest thermal flux is generated in an intermediate section of the heating element.

Further advantageous features of the invention are set out in the appended claims.

The invention further refers to a method for demolition and cutting operations on blocks of hard material such as stones or the like, comprising:
making one or more holes in said block;
inserting an expansive mortar in said holes;
and make said mortar to expand thereby cutting said block.

According to the invention, this method is improved by providing a controlled heating of the mortar by means of a heating element inserted in the holes. The heating element can be controlled advantageously to provide varying amounts of heat to the hole and preferably a large quantity of heat to the area around the bottom of the hole, in order to better expand the hole. Also the amount of heat can be varied over time and as a function of the environmental temperature, for better fracturing of the rock.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
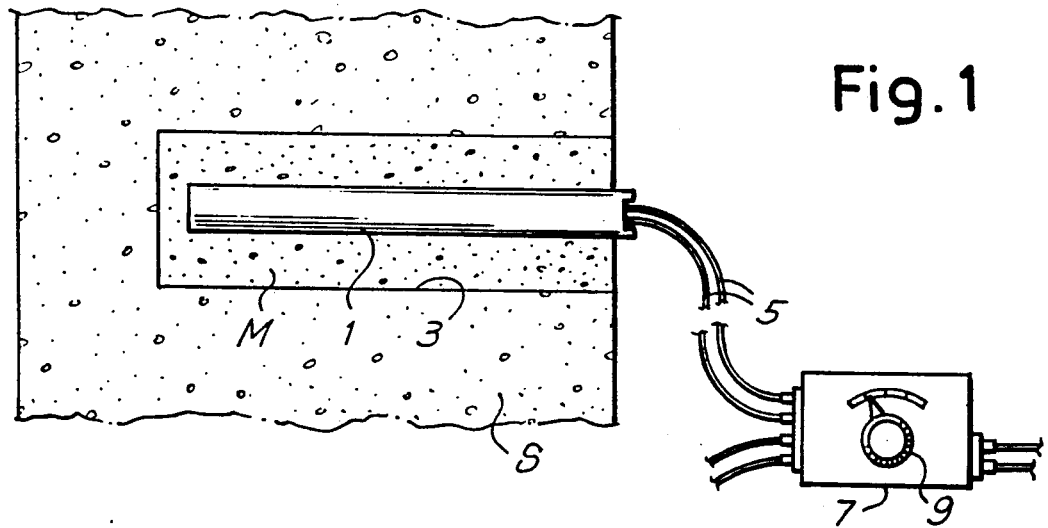
FIG. 1 shows very diagrammatically a device according to the invention with a heating element introduced in a hole in a mass of hard material to be cut or demolished.

As is known, expansive mortars—which are advantageously used in place of explosives for demolitions and detachment of blocks of rock in quarries, and for similar uses—are very slow-acting, as a result of which, once the preparations have been made, it is necessary to wait an excessively long time to obtain the desired effect. The action of said mortars can be shortened by means of heating. Attempts to heat the mortar by means of chemical additives have not hitherto proven satisfactory. It has therefore been necessary to resort to heating means which are simpler and can be better controlled.

As is apparent from the drawing, the device according to the invention comprises a heating element 1 provided with an electrical resistor, which in the example of the drawing has the external design of a rectilinear pipe made of metal, ceramic or the like, and is arranged in use within a hole 3. In the following description reference numeral 1 will be used to indicate generally both the heating element and the resistor provided inside said heating element. The hole 3 usually forms part of a row of holes, which are approximately equal and equidistant and usually have co-planar axes, and which are made in a masonry mass S or in a mass of rock or concrete in order to bring about —by means of expansive mortar M introduced into the holes—extensive fracturing thereof. These holes are mutually spaced at a greater or lesser distance, depending on the tensile strength of the material to be demolished and on the unitary pressure which can be exerted by the action of the expansive mortar on the inner walls of the hole 3. The electrical resistor 1 is connected by means of a pair of conductors 5 to a power supply apparatus 7. The power supply apparatus or means has the function of supplying the resistor 1 with a low-voltage current which is usually less than 50 V. The power supply apparatus may comprise, internally, a transformer in order to reduce the mains voltage to below 50 V, and the output of the transformer may possess multiple terminals corresponding to preselected voltage values, such as for example 24, 36 and 48 V; thus, by means of a manual switch 9, it is possible to supply the resistor 1 at increasing voltage levels for specific periods of time. In this manner, the resistor 1 is caused to bring about the gradual heating of the mortar M which surrounds it (and which is usually in the form of a fluid "grout" or "slurry") to accelerate the expansion thereof in a controlled manner. This heating, which is necessary in order to shorten the expansion—which takes place after many hours at ambient temperature - depends for example on the type of mortar used, and on the ambient temperature, and has to be obtained by means of precise procedures.

It is also possible for the power supply to the resistor 1 to be regulated by means of a programming member on which the values of the voltage to be applied to the terminals of the resistor and the predetermined application times are input one by one. Alternatively, the programming member, in which the characteristic data for the various types of expansive mortar, and the value of the resistor 1, are memorized, will itself be able to determine the voltage values and application times for the latter, as a function for example of the ambient temperatures—which will have to be input on each occasion or introduced automatically by a sensor—and of the type of mortar used.

It is apparent that a single power supply apparatus 7 will be able to serve to supply plurality of resistors 1 placed in respective holes 3, said apparatus 7 being able to be operated by hand or controlled by a programming member, or forming part of the latter.

The resistors, such as the resistor designated 1, can be produced in various lengths in order to be able to exert their heating action in holes of corresponding length. Alternatively, said resistors may be produced to a standard length and be sectional, in the sense of being able to be fitted one onto the other in the axial direction, in a manner such as to form a single assembly—composed of coaxial adjacent units—in which the quantity of heat supplied is approximately equal for each element. In addition to mechanical fitting, the electrical connection of said sectional resistors will have to be provided, which will preferably (but not necessarily) have to be a parallel connection, in a manner such that a particular apparatus 7, having outputs at set voltage levels and suitable power, will be able to supply either single resistors of standard length or a certain number of resistors of greater length obtained by combining said resistors of sectional construction.

It is clear that the electrical connection between two sectional resistors will have to be protected from the water contained in the mortar, and in general against external agents, which protection will be achievable by means of suitable sealing members expediently placed where a given resistor fits onto an adjoining resistor. in addition, a standard resistor of the sectional type will have to be fitted with a leaktight closure means for the fittable ends, suitable for protecting the electrical contacts thereof, such as a screw-cap or the like, in a manner such as to be able to be used individually.

Figure 2:
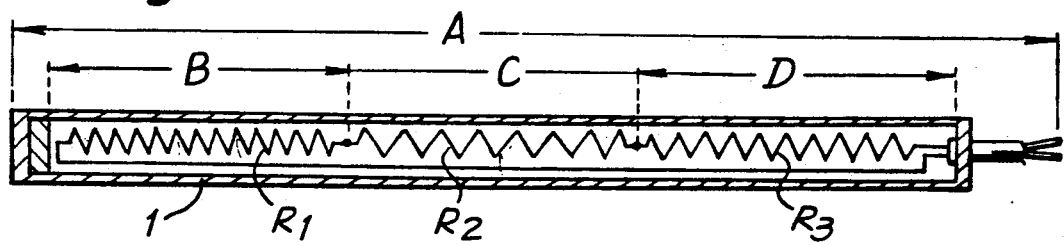
FIG. 2 shows a schematic section of a heating element along its axis.

FIG. 2 diagrammatically shows a preferred embodiment of the heating element 1. Within said heating element 1 there is provided a heating resistor having portions of different resistance. More particularly there is provided a first section having a length equal to B and a resistance R1 suitable for generating a higher thermal flux. When the element 1 is introduced in the relevant hole, said section B will be placed near the bottom of the hole. In the intermediate portion of the heating element 1 there is provided a section having a length C and a resistance R2 which is lower than that of section B. At the opposite end of the heating element, there is provided a third section having a length D and a resistance R3 which is greater than R2 and smaller than R1. The section D will be placed adjacent the opening of hole 3 when in use. The total length of heating element 1 is A. With this particular arrangement an optimal heating is achieved thus obtaining the desired accelerating effect on the expansive mortar M. Moreover expansion of the mortar outside the hole 3 is avoided. The following Table I shows possible values for A, B, C, R1, R2, R3 in several embodiments. The voltage supply is 40 V.

TABLE I

| | | |
|---|---|---|
| A = 50 cm | B = 15 cm | 60 W |
| | C = 15 cm | 40 W |
| | D = 15 cm | 50 W |
| A = 100 cm | B = 32 cm | 120 W |
| | C = 32 cm | 80 W |
| | D = 32 cm | 100 W |
| A = 200 cm | B = 65 cm | 240 W |
| | C = 65 cm | 160 W |
| | D = 65 cm | 200 W |

Figure 3:
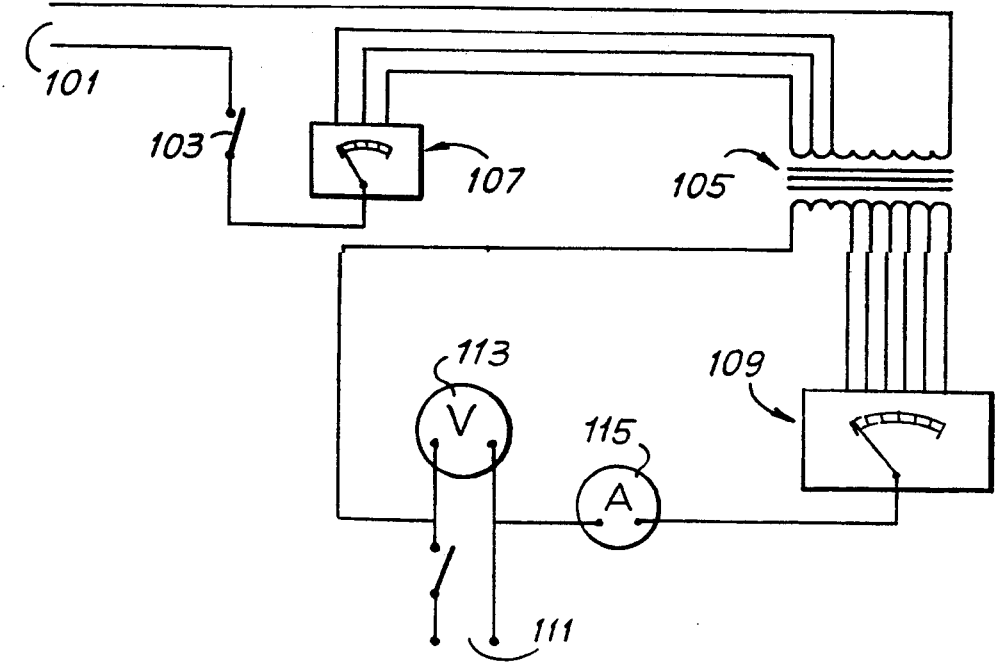
FIG. 3 is a diagram of the electric power supply.

FIG. 3 shows a diagrammatic scheme of a possible power supply unit 7 for one or several heating elements 1.

The unit 7 is supplied by 101 with alternate current at 220 V or 380 V, or other suitable mains voltage normally used. 103 is a general cut-out; 105 is a transformer; 107 is a regulator for a step-regulation for example for varying the transformer by +or −15 V; 109 is a voltage regulator for varying the transformer output voltage for example between 24 and 52 V; 111 is the output connection for the heating elements 1. Numerals 113 and 115 are voltmeter and ammeter devices.

The regulator 109 allows a step-by-step voltage variation between 24 and 52 V (these values being intended as an example only) in order to vary the thermal power generated by the heating element 1. This is particularly advantageous in all cases in which the environment temperature varies. In fact the time for the expansion reaction of the mortar is dependent on the temperature: when the environment temperature is very low, a higher voltage for the supply allows to maintain the reaction time at a suitable value.

Since the power employed is relatively modest, the apparatus 7 (or other more complex apparatus) may be powered not only by the mains voltage but also by means of current generated in the quarry or at the site by means of a small electricity generating unit driven by a combustion engine, by means of a compressed-air motor, or even by means of electric batteries.

The advantages of the device according to the invention are apparent, said device making it possible to achieve a decisive shortening of the period required for the expansive mortars to exert their action: from periods of several hours or even several tens of hours, a reduction is achieved to very short items such as approximately twenty or thirty minutes. While a specific embodiment of the invention has been shown and described in detail to illustrate the application of the principles of the invention, it will be understood that the invention may be embodied otherwise without departing from such principles.

I claim:

1. A method for fracturing a block of hard material, the method comprising the steps of:
   creating a hole in the block;

inserting an expansive mortar in said hole;

inserting a heating element in said hole such that said heating element is surrounded by said expansive mortar in said hole; and generating heat in said heating element in a controlled and sufficient manner to expand said expansive mortar and fracture the block, said generation of heat being variable depending on environmental temperature, axial position along said heating element, and the degree of expansion of said expansive mortar.

2. The method as claimed in claim 1, wherein maximum thermal flux is generated in a portion near a bottom of the hole, and minimum thermal flux being generated in an intermediate section of the hole.

* * * * *